United States Patent
O'Loughlin et al.

[11] Patent Number: 6,095,550
[45] Date of Patent: Aug. 1, 2000

[54] VEHICLE OCCUPANT RESTRAINT APPARATUS

[75] Inventors: John P. O'Loughlin, Gilbert; Jess A. Cuevas, Scottsdale; Ahmad K. Al-Amin, Higley; Wael S. Elqadah, Gilbert; Roy D. Van Wynsberghe, Mesa; Bryan W. Shirk, Mesa; Timothy A. Swann, Mesa, all of Ariz.

[73] Assignee: TRW Inc., Lyndhurst, Ohio

[21] Appl. No.: 09/093,896

[22] Filed: Jun. 9, 1998

[51] Int. Cl.⁷ ..................................................... B60R 21/22
[52] U.S. Cl. ..................... 280/730.1; 280/728.2; 280/733; 280/749
[58] Field of Search .............................. 280/730.1, 728.2, 280/733, 749; 297/216.12, 216.13

[56] References Cited

U.S. PATENT DOCUMENTS

| | | |
|---|---|---|
| 1,977,159 | 10/1934 | Tursi ........................................ 297/112 |
| 2,985,229 | 5/1961 | Shamblin ............................... 297/410 |
| 3,397,911 | 8/1968 | Brosius, Sr. . |
| 3,510,150 | 5/1970 | Wilfert . |
| 3,703,313 | 11/1972 | Schiesterl et al. . |
| 3,779,577 | 12/1973 | Wilfert ................................. 280/730.1 |
| 3,953,049 | 4/1976 | Surace et al. ......................... 280/730.1 |
| 5,505,486 | 4/1996 | Ahn . |
| 5,738,407 | 4/1998 | Locke .................................... 280/730.1 |
| 5,803,486 | 9/1998 | Spencer et al. ....................... 280/728.2 |
| 5,833,312 | 11/1998 | Lenz ..................................... 280/730.1 |

FOREIGN PATENT DOCUMENTS

2841729A1   4/1980   Germany .

*Primary Examiner*—Michael Mar
*Assistant Examiner*—Hau Phan
*Attorney, Agent, or Firm*—Tarolli, Sundheim, Covell, Tummino & Szabo L.L.P.

[57] ABSTRACT

An apparatus (10) includes a vehicle seat back (20) and an inflatable vehicle occupant protection device (18) supported on the seat back (20) for deployment upward from the upper end (62) of the seat back (20). The apparatus (10) further includes a backing member (70) supported on the seat back (20) for movement from a retracted position to a deployed position under the influence of inflation fluid pressure forces applied by the protection device (18). When the backing member (70) is in the deployed position, it projects upward from the upper end (62) of the seat back (20) at a location behind the protection device (18). The backing member (70) is non-deflectable under the influence of the inflation fluid pressure forces applied by the protection device (18).

4 Claims, 1 Drawing Sheet

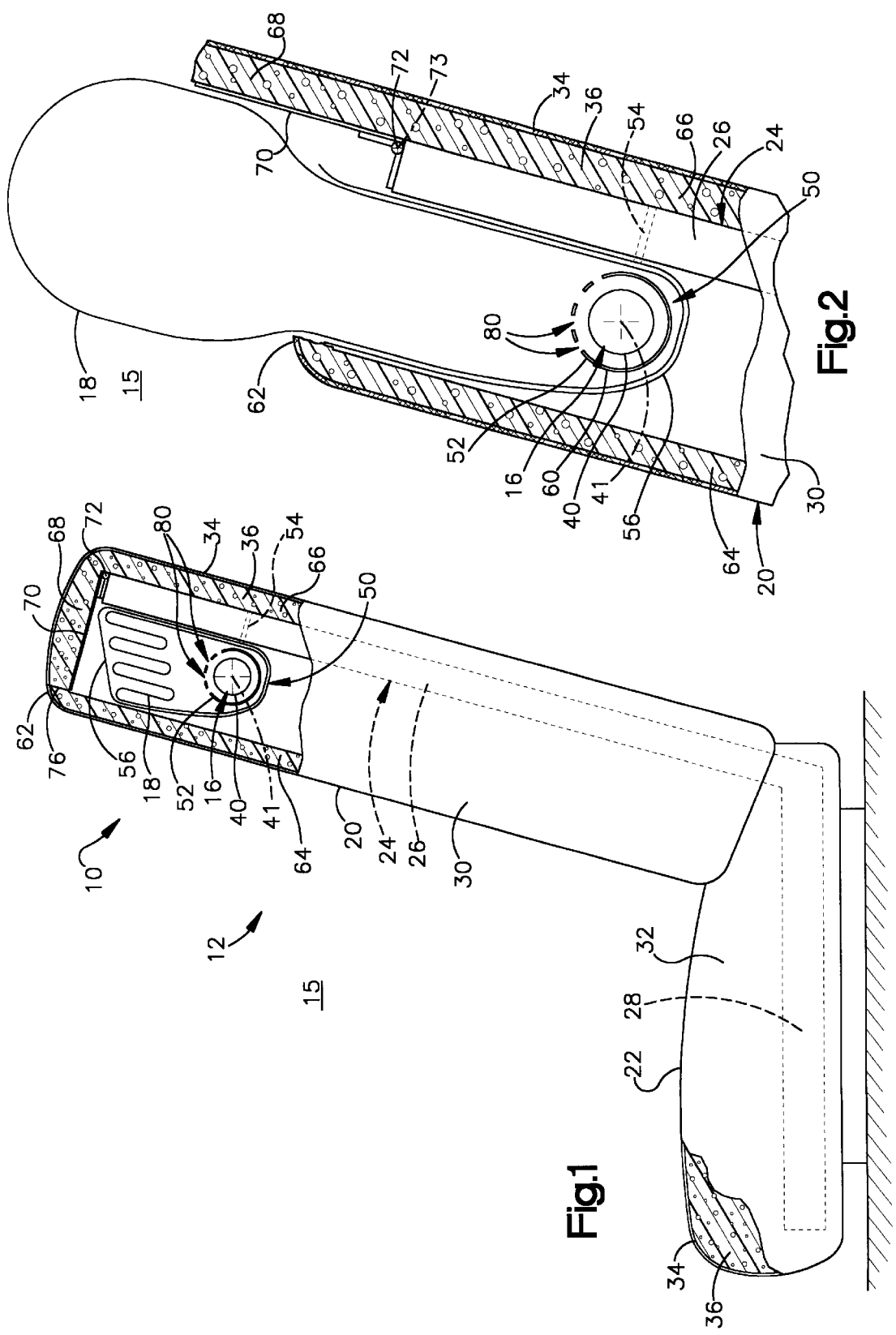

VEHICLE OCCUPANT RESTRAINT APPARATUS

FIELD OF THE INVENTION

The present invention relates to an apparatus for restraining an occupant of a vehicle seat upon the occurrence of a vehicle crash.

BACKGROUND OF THE INVENTION

A vehicle crash may cause an occupant of a vehicle seat to move in a rearward direction relative to the seat. Therefore, a vehicle seat typically is equipped with a vehicle occupant protection device, such as a headrest or an inflatable device, for restraining rearward movement of a seated occupant's head and neck.

SUMMARY OF THE INVENTION

In accordance with the present invention, an apparatus comprises a vehicle seat back and an inflatable vehicle occupant protection device. The protection device is supported on the seat back for deployment upward from the upper end of the seat back. The apparatus further comprises a backing member which is supported on the seat back for movement from a retracted position to a deployed position under the influence of inflation fluid pressure forces applied by the protection device.

When the backing member is in the deployed position, it projects upward from the upper end of the seat back at a location behind the protection device. The backing member is non-deflectable under the influence of the inflation fluid pressure forces applied by the protection device.

The present invention helps the protection device restrain rearward movement of a seated occupant's head and neck upon the occurrence of a vehicle crash. This is because the non-deflectable backing member restrains rearward movement of the protection device.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 1 is a side view of an apparatus comprising a preferred embodiment of the present invention, with certain parts being shown schematically; and FIG. 2 is an enlarged partial view of the apparatus of FIG. 1 showing parts in different positions.

DESCRIPTION OF A PREFERRED EMBODIMENT

An apparatus 10 comprising a preferred embodiment of the present invention is shown in FIG. 1. The apparatus 10 includes a vehicle seat 12 in a vehicle occupant compartment 15. The apparatus 10 further includes an inflator 16 and a particular type of inflatable vehicle occupant protection device 18 which is known as an air bag.

The seat 12 comprises a seat back 20 and a seat bottom 22. More specifically, the seat 12 has a frame 24 with a back portion 26 and a bottom portion 28. The seat back 20 is defined in part by the back portion 26 of the frame 24 and in part by a back cushion 30 that covers the back portion 26 of the frame 24. The seat bottom 22 is similarly defined in part by the bottom portion 28 of the frame 24 and in part by a bottom cushion 32 that covers the bottom portion 28 of the frame 24. Each of the cushions 30 and 32 is a deflectable structure comprising an outer layer 34 on a compressible base 36. The outer layers 34 are preferably formed of fabric or leather. The bases 36 are preferably formed of elastomeric foam.

The inflator 16 and the air bag 18 are mounted in the seat back 20 on the back portion 26 of the frame 24, and are covered by the back cushion 30. As shown schematically in the drawings, the inflator 16 has an elongated cylindrical housing 40 with a longitudinal central axis 41. The housing 40 contains a source of inflation fluid for inflating the air bag 18. The housing 40 may thus contain pressurized inflation fluid, a body of ignitable gas generating material, or a combination of pressurized inflation fluid and ignitable material for heating the inflation fluid.

The air bag 18, which also is shown schematically in the drawings, is constructed of one or more panels of a known air bag material. Such materials include woven materials and plastic films. The panels of air bag material are interconnected along seams that are formed by stitches, ultrasonic welds, adhesives, heat staking, or the like, depending on the particular air bag material of which the panels are formed. Preferably, the air bag 18 is constructed of panels formed of nylon fabric which is coated with silicone. Any suitable arrangement of folds can be used to place the air bag 18 in the folded, uninflated condition in which it is shown in FIG. 1.

The inflator 16 and the air bag 18 in the preferred embodiment of the present invention are parts of an air bag module 50 which is assembled separately from the seat frame 24. Other parts of the module 50 include a diffuser 52 and a plurality of fasteners 54 (one of which is shown in FIGS. 1 and 2). The inflator 16 is received within the diffuser 52. The fasteners 54 project from the diffuser 52 to the back portion 26 of the frame 24 to fasten the module 50 to the back portion 26 of the frame 24. A rupturable plastic module cover 56 encloses the air bag 18, the diffuser 52, and the inflator 16.

The back cushion 30 has front and rear panel sections 64 and 66 extending fully along the length of the seat back 20, as shown in FIG. 1. The back cushion 30 further has a top panel section 68 extending fully across the thickness of the seat back 20 between the front and rear panel sections 64 and 66. A backing support member in the form of a deployment door 70 extends partially across the thickness of the seat back 20, and is interposed vertically between the air bag 18 and the top panel section 68. A hinge 72 supports the deployment door 70 on the back portion 26 of the frame 24 for movement pivotally about a horizontal axis 73 (FIG. 2). The deployment door 70 is movable pivotally from a retracted position, as shown in FIG. 1, to a deployed position, as shown in FIG. 2. The hinge 72 blocks further movement of the deployment door 70 pivotally beyond the deployed position of FIG. 2.

The vehicle may experience a crash for which inflation of the air bag 18 is desired to help protect an occupant of the seat 12. The inflator 16 is then actuated in a known manner and rapidly emits a large quantity of inflation fluid. The diffuser 52 has an array of outlet openings 80 which direct the inflation fluid to flow from the inflator 16 into the air bag 18 to inflate the air bag 18. In accordance with the present invention, the air bag 18 and the outlet openings 80 in the diffuser 52 are oriented such that the inflation fluid deploys the air bag 18 outward from the seat back 20 in a direction upward from the upper end 62 of the seat back 20, as shown in FIG. 2.

As the inflation fluid emerging from the diffuser 52 begins to inflate the air bag 18, it moves the air bag 18 against the module cover 56. The inflation fluid pressure forces acting on the air bag 18 rupture the module cover 56 and move the air bag 18 upward against the deployment door 70. The inflation fluid pressure forces then press the deployment door 70 against the top section 68 of the back cushion 30 forcefully enough to rupture the top section 68. As shown in FIG. 1, the top section 68 of the back cushion 30 preferably is provided with a tear seam 76 to ensure that it will rupture in a predetermined configuration.

As the inflation fluid continues to inflate the air bag 18, it causes the air bag 18 to move the deployment door 70 pivotally upward from the retracted position to the deployed position as the air bag 18 moves upward past the upper end 62 of the seat back 20. The air bag 18 is thus deployed into the vehicle occupant compartment 15 to a position behind the head and neck of an occupant of the seat 12.

Further in accordance with the present invention, the deployment door 70 and the hinge 72 are non-deflectable under the influence of the inflation fluid pressure forces applied by the inflating air bag 18. This feature of the invention is preferably achieved by forming the deployment door 70 and the hinge 72 of a suitably strong metal material. Accordingly, when the deployment door 70 is in the deployed position of FIG. 2, it provides the air bag 18 with backing support that restrains movement of the air bag 18 rearwardly relative to the seat back 20. Such backing support helps the air bag 18 restrain the head and neck of an occupant of the seat 12.

From the above description of the invention, those skilled in the art will perceive improvements, changes and modifications. Such improvements, changes and modifications within the skill of the art are intended to be covered by the appended claims.

What is claimed is:

1. Apparatus comprising:

a vehicle seat back having an upper end and being supported by a stationary seat frame;

an inflatable vehicle occupant protection device mounted in said seat back and supported by said seat frame for deployment upward through an opening in said upper end of said seat back;

a backing member supported on said seat back for movement from a retracted position to a deployed position under the influence of inflation fluid pressure forces applied by said protection device upon inflation of said protection device;

said backing member covering said opening when in said retracted position and projecting upward from said upper end of said seat back at a location behind said protection device when said backing member is in said deployed position; and a hinge pivotally connecting said backing member to said stationary seat frame for pivotal movement from said retracted position to said deployed position;

said backing member and said hinge being non-deflectable under the influence of said inflation fluid pressure forces, whereby said backing member restrains movement of said protection device rearwardly relative to said seat back when said backing member is in said deployed position.

2. Apparatus as defined in claim 1 wherein said backing member comprises a deployment door.

3. Apparatus as defined in claim 2 wherein said seat back comprises a cushion covering said seat frame, said deployment door and said hinge being mounted on said seat frame separately from said protection device.

4. Apparatus as defined in claim 3 wherein said cushion has a front panel section, a rear panel section, and a top panel section extending across the thickness of said seat back between said front and rear panel sections, said deployment door extending partially across said thickness of said seat back at a location vertically between said protection device and said top panel section of said cushion when said deployment door is in said retracted position.

* * * * *